US008743038B2

(12) United States Patent
Wu et al.

(10) Patent No.: US 8,743,038 B2
(45) Date of Patent: Jun. 3, 2014

(54) DISPLAY APPARATUS

(75) Inventors: Chi-Lin Wu, New Taipei (TW);
Wei-Ting Yen, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 184 days.

(21) Appl. No.: 13/477,059

(22) Filed: May 22, 2012

(65) Prior Publication Data
US 2013/0169518 A1  Jul. 4, 2013

(30) Foreign Application Priority Data

Dec. 30, 2011  (TW) .............................. 100149867 A

(51) Int. Cl.
*G09G 3/34* (2006.01)
(52) U.S. Cl.
USPC ............................. 345/88; 345/102; 359/463
(58) Field of Classification Search
USPC ..................................... 345/88, 204; 359/463
See application file for complete search history.

(56) References Cited

U.S. PATENT DOCUMENTS

| 6,137,456 | A | 10/2000 | Bhagavatula et al. |
|---|---|---|---|
| 6,157,424 | A | 12/2000 | Eichenlaub |
| 6,172,807 | B1 | 1/2001 | Akamatsu |
| 6,396,873 | B1 | 5/2002 | Goldstein et al. |
| 6,525,878 | B1 | 2/2003 | Takahashi |
| 6,831,624 | B1 | 12/2004 | Harrold |
| 6,877,857 | B2 | 4/2005 | Perlin |
| 6,932,476 | B2 | 8/2005 | Sudo et al. |
| 6,975,439 | B2 | 12/2005 | Thomason et al. |
| 7,425,069 | B2 | 9/2008 | Schwerdtner et al. |
| 7,646,537 | B2 | 1/2010 | Shestak |
| 7,671,935 | B2 | 3/2010 | Mather et al. |
| 7,692,859 | B2 | 4/2010 | Redert et al. |
| 7,903,183 | B2 | 3/2011 | Jacobs et al. |
| 2006/0279567 | A1 | 12/2006 | Schwerdtner et al. |
| 2008/0002255 | A1 | 1/2008 | Tavor et al. |
| 2008/0037120 | A1* | 2/2008 | Koo et al. ..................... 359/463 |
| 2009/0002819 | A1 | 1/2009 | Kim et al. |

(Continued)

FOREIGN PATENT DOCUMENTS

TW           200900736           1/2009

OTHER PUBLICATIONS

Lee et al, "A High Resolution Autostereoscopic Display Employing a Time Division Parallax Barrier," 2006, SID 06 Digest, pp. 81-84.

(Continued)

*Primary Examiner* — Premal Patel
(74) *Attorney, Agent, or Firm* — Jianq Chyun IP Office

(57) ABSTRACT

A display apparatus including a backlight module, a filtering module and a display panel is provided. The backlight module includes a plurality of sets of light emitting devices. Each set of light emitting devices includes at least one first color light emitting device and at least one second color light emitting device. The filtering module is disposed on a transmission path of light emitted by the plurality of sets of light emitting devices and includes a plurality of sets of filtering units. Each set of filtering units is configured to allow light emitted by one set of light emitting devices to pass through. The display panel is disposed on the transmission path of the light emitted by the plurality of sets of light emitting devices. The backlight module turns on the plurality of sets of light emitting devices by turns.

20 Claims, 16 Drawing Sheets

(56) References Cited

U.S. PATENT DOCUMENTS

| | | | |
|---|---|---|---|
| 2009/0040426 A1 | 2/2009 | Mather et al. | |
| 2009/0315883 A1 | 12/2009 | King | |
| 2010/0026632 A1* | 2/2010 | Ishida et al. | 345/170 |
| 2011/0090413 A1* | 4/2011 | Liou | 349/15 |
| 2011/0115827 A1* | 5/2011 | Tanaka | 345/690 |
| 2011/0122467 A1 | 5/2011 | Futterer et al. | |
| 2012/0212487 A1* | 8/2012 | Basler et al. | 345/419 |

OTHER PUBLICATIONS

Schultz et al:, "Late-News Paper: Full Resolution Autostereoscopic 3D Display for Mobile Applications," 2009, SID 09 Digest, pp. 127-130.

Sasagawa et al., "Dual Directional Backlight for Stereoscopic LCD," 2003, SID 03 Digest, pp. 399-401.

Chien et al., "3D Mobile Display Based on Sequentially Switching Backlight with Focusing Foil," 2004, SID 04 Digest, pp. 1434-1437.

Electronista, "3M intros 3D optical film for handheld displays," Oct. 5, 2009, Available at: http://www.electronista.com/articles/09/10/05/3m.shows.easily.integratable.3d.optical.film/.

Heresy, "Brief of Stereoscopic Display Technique: 5. Spatial-multiplexed Plane Bare-eyed Stereoscopic Display System," 2010, Available at: http://viml.nchc.org.tw/blog/paper_info.php?CLASS_ID=1&SUB_ID=1&PAPER_ID=150.

\* cited by examiner

DISPLAY APPARATUS

CROSS-REFERENCE TO RELATED APPLICATION

This application claims the priority benefit of Taiwan application serial no. 100149867, filed on Dec. 30, 2011. The entirety of the above-mentioned patent application is hereby incorporated by reference herein and made a part of this specification.

BACKGROUND

1. Technical Field

The disclosure relates to a display apparatus.

2. Related Art

The autostereoscopic display technology widely developed at present mainly has two types: spatial multiplexed 3D display and temporal multiplexed 3D display. The two technologies both rely on that the brain can fuse different images seen by left and right eyes to make it look like a stereoscopic image. The spatial multiplexing is to reconstruct a stereoscopic image while sacrificing resolution. To enable the stereoscopic image to be viewed from more angles, multiple views cause the resolution of the three-dimensional image to become half (or even less) of the resolution of the two-dimensional image, thereby degrading the quality of the image.

Compared with the spatial multiplexing mode, the temporal multiplexing mode is characterized by maintaining resolution or reducing resolution loss. In a conventional temporal multiplexing mode, a stereoscopic image display projects an image of one viewing angle into the left eye of a viewer at a time point and projects an image of another viewing angle into the right eye of the viewer at a next time point. When the images of the two viewing angles are switched fast enough, the brain will be unaware of the switching of the images, so as to form a stereoscopic image pair in which viewing angles of images of the left and right eyes are slightly different.

From the 480p (progressive scan) resolution of a conventional cathode ray tube (CRT) to the 1080p (progressive scan) resolution of a current high-definition signal display, consumers' requirements for high-definition displays never change. However, two major problems including reduced resolution and limited viewing angle are common to current spatial multiplexed autostereoscopic displays. Due to the working principle of the spatial multiplexed autostereoscopic display, although the presentation way of multi-view images can increase viewing comfort for the viewer, the resolution is reduced to a greater extent with more views, and the screen resolution is reduced to 1/n in case of n views. To solve the problem of reduced resolution, the most direct idea is to increase display resolution, but the display resolution cannot be increased without limit, because the difficulty and cost of display manufacturing need to be taken into account. With the progress of technology, a display with high display frequency can solve the problem of limited space for the display, and together with directional backlight, can project light from different directions into different views in a very short time. In addition, multi-view frame presentation can be achieved by using a lenticular film or parallax barrier. However, since small spacing between a general light emitting diode light source and other light sources is hard to achieve, the pitch of the lenticular lens or parallax barrier is too large, and thus stripes in viewing are produced.

SUMMARY

A display apparatus is introduced in an exemplary embodiment. The display apparatus comprises a backlight module, a filtering module and a display panel. The backlight module includes a plurality of sets of light emitting devices. Each set of light emitting devices comprises at least one first color light emitting device and at least one second color light emitting device. Primary wavelength ranges of light emitted by the first color light emitting devices in different sets of light emitting devices are different from each other, and primary wavelength ranges of light emitted by the second color light emitting devices in different sets of light emitting devices are different from each other. The filtering module is disposed on a transmission path of light emitted by the plurality of sets of light emitting devices and comprises a plurality of sets of filtering units. Each set of filtering units comprises a plurality of filtering units, and each set of filtering units is configured to allow light emitted by one set of light emitting devices in the plurality of sets of light emitting devices to pass through and block light emitted by another set of light emitting devices. The display panel is disposed on the transmission path of the light emitted by the plurality of sets of light emitting devices. The backlight module turns on the plurality of sets of light emitting devices by turns. In addition, the display panel displays an image corresponding to one set of light emitting devices being turned on in each sub-frame time of each frame time.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1A:
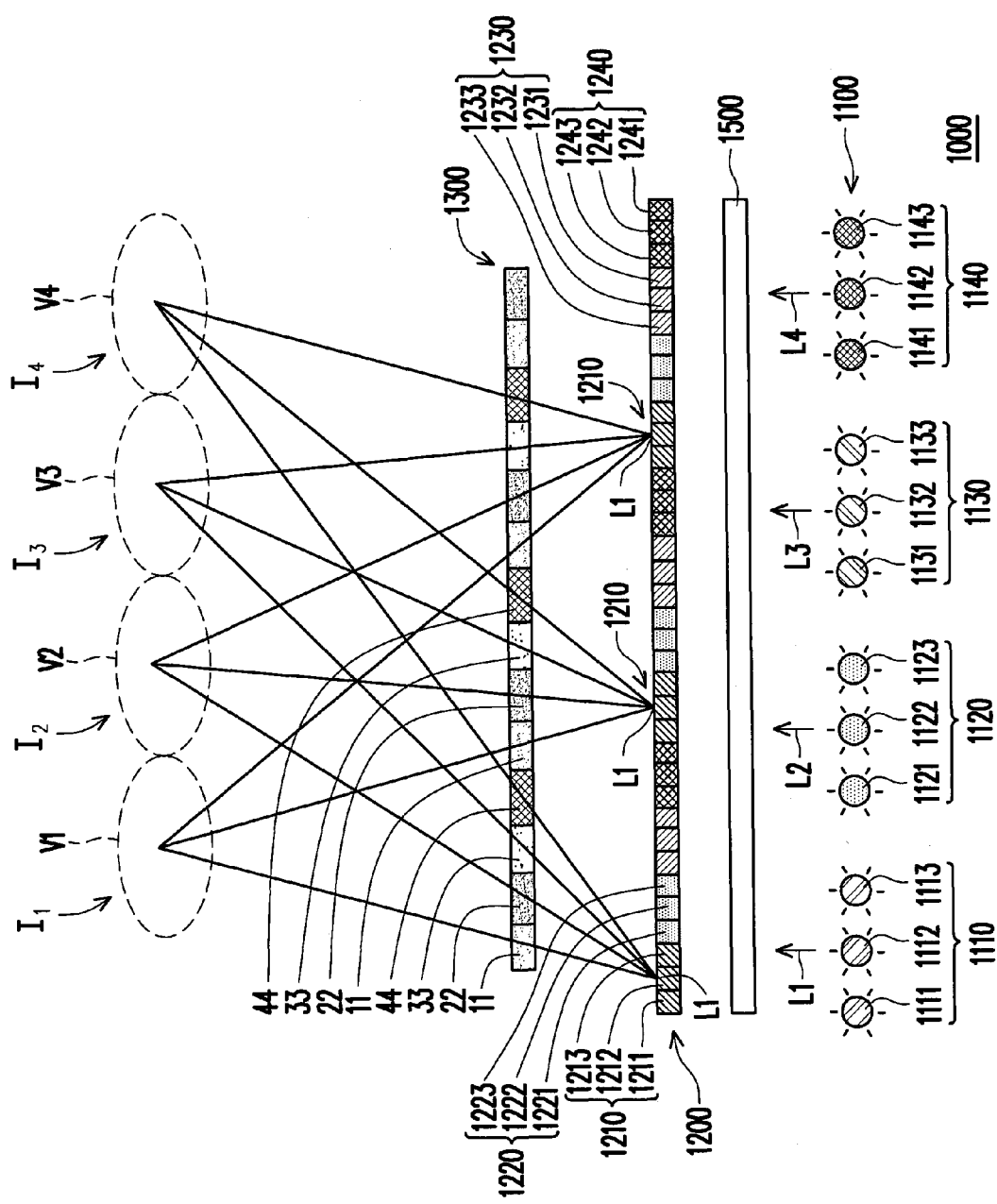
FIG. 1A is a schematic diagram of a display apparatus according to an exemplary embodiment.

FIG. 1A is a schematic diagram of a display apparatus according to an exemplary embodiment. Referring to FIG. 1A, the display apparatus 1000 in this embodiment comprises a backlight module 1100, a filtering module 1200 and a display panel 1300. The backlight module 1100 comprises a plurality of sets of light emitting devices 1110, 1120, 1130 and 1140. Each set of light emitting devices 1110, 1120, 1130, 1140 comprises at least one first color light emitting device 1111, 1121, 1131, 1141 and at least one second color light emitting device 1112, 1122, 1132, 1142. For example, the set of light emitting devices 1110 comprises at least one first color light emitting device 1111 and at least one second color light emitting device 1112, and the set of light emitting devices 1120 comprises at least one first color light emitting device 1121 and at least one second color light emitting device 1122. Primary wavelength ranges of light emitted by the first color light emitting devices 1111-1141 in different sets of light emitting devices 1110-1140 are different from each other, and primary wavelength ranges of light emitted by the second color light emitting devices 1112-1142 in different sets of light emitting devices 1110-1140 are different from each other. In other words, the primary wavelength ranges of light respectively emitted by the first color light emitting device 1111, the first color light emitting device 1121, the first color light emitting device 1131 and the first color light emitting device 1141 are different from each other, and the primary wavelength ranges of light respectively emitted by the second color light emitting device 1112, the second color light emitting device 1122, the second color light emitting device 1132 and the second color light emitting device 1142 are different from each other.

The filtering module 1200 in this embodiment is disposed on a transmission path of light L1, L2, L3, L4 emitted by the plurality of sets of light emitting devices 1110-1140 and comprises a plurality of sets of filtering units 1210, 1220, 1230 and 1240. Each set of filtering units 1210, 1220, 1230, 1240 comprises a plurality of filtering units 1210, 1220, 1230, 1240. For example, the set of filtering units 1210 comprises a plurality of filtering units 1210, and the set of filtering units 1220 comprises a plurality of filtering units 1220. In addition, each set of filtering units 1210-1240 is configured to allow light emitted by one set of light emitting devices 1110-1140 in the plurality of sets of light emitting devices 1110-1140 to pass through and block light emitted by other sets of light emitting devices 1110-1140. For example, the filtering unit 1210 is configured to allow light emitted by the set of light emitting devices 1110 to pass through and block light emitted by other sets of light emitting devices 1120, 1130 and 1140. The filtering unit 1220 is configured to allow light emitted by the set of light emitting devices 1120 to pass through and block light emitted by other sets of light emitting devices 1110, 1130 and 1140. The filtering unit 1230 is configured to allow light emitted by the set of light emitting devices 1130 to pass through and block light emitted by other sets of light emitting devices 1110, 1120 and 1140. The filtering unit 1240 is configured to allow light emitted by the set of light emitting devices 1140 to pass through and block light emitted by other sets of light emitting devices 1110, 1120 and 1130. In addition, the display panel 1300 is disposed on the transmission path of the light L1, L2, L3, L4 emitted by the plurality of sets of light emitting devices 1110-1140. The backlight module 1100 turns on the plurality of sets of light emitting devices 1110-1140 by turns.

Referring to FIG. 1A, in this embodiment, each set of light emitting devices 1110-1140 not only comprises the first color light emitting device 1111-1141 and the second color light emitting device 1112-1142, but also comprises a third color light emitting device 1113-1143. However, the number and color type of the light emitting devices in each set of light emitting devices 1110-1140 are not limited to FIG. 1A. In other words, the designer may make adjustment according to actual requirements. For example, the set of light emitting devices 1110 further comprises a third color light emitting device 1113, and the set of light emitting devices 1120 further comprises a third color light emitting device 1123.

In this embodiment, the backlight module 1100 may be a color mixing backlight source, for example, a white light backlight source. Specifically, the first color light emitting device 1111-1141, the second color light emitting device 1112-1142 and the third color light emitting device 1113-1143 in each set of light emitting devices 1110-1140 in the backlight module 1100 are, for example, respectively a blue light emitting device, a green light emitting device and a red light emitting device, and light emitted by the three kinds of light emitting devices is mixed into white light. For example, the first color light emitting device 1111, the second color light emitting device 1112 and the third color light emitting device 1113 are, for example, respectively a blue light emitting device, a green light emitting device and a red light emitting device. However, in other embodiments, each set of light emitting devices may also comprise a first color light emitting device and a second color light emitting device, and not comprise a third color light emitting device, in which the first color light emitting device and the second color light emitting device are, for example, respectively, a blue light emitting device and a yellow light emitting device, or respectively a red light emitting device and a cyan light emitting device, or respectively a green light emitting device and a magenta light emitting device; in this way, light emitted by the first color light emitting device and the second color light emitting device may also be mixed into white light. In this embodiment, the first color light emitting device 1111, the second color light emitting device 1112 and the third color light emitting device 1113 are, for example, light emitting diodes.

Figure 1B:
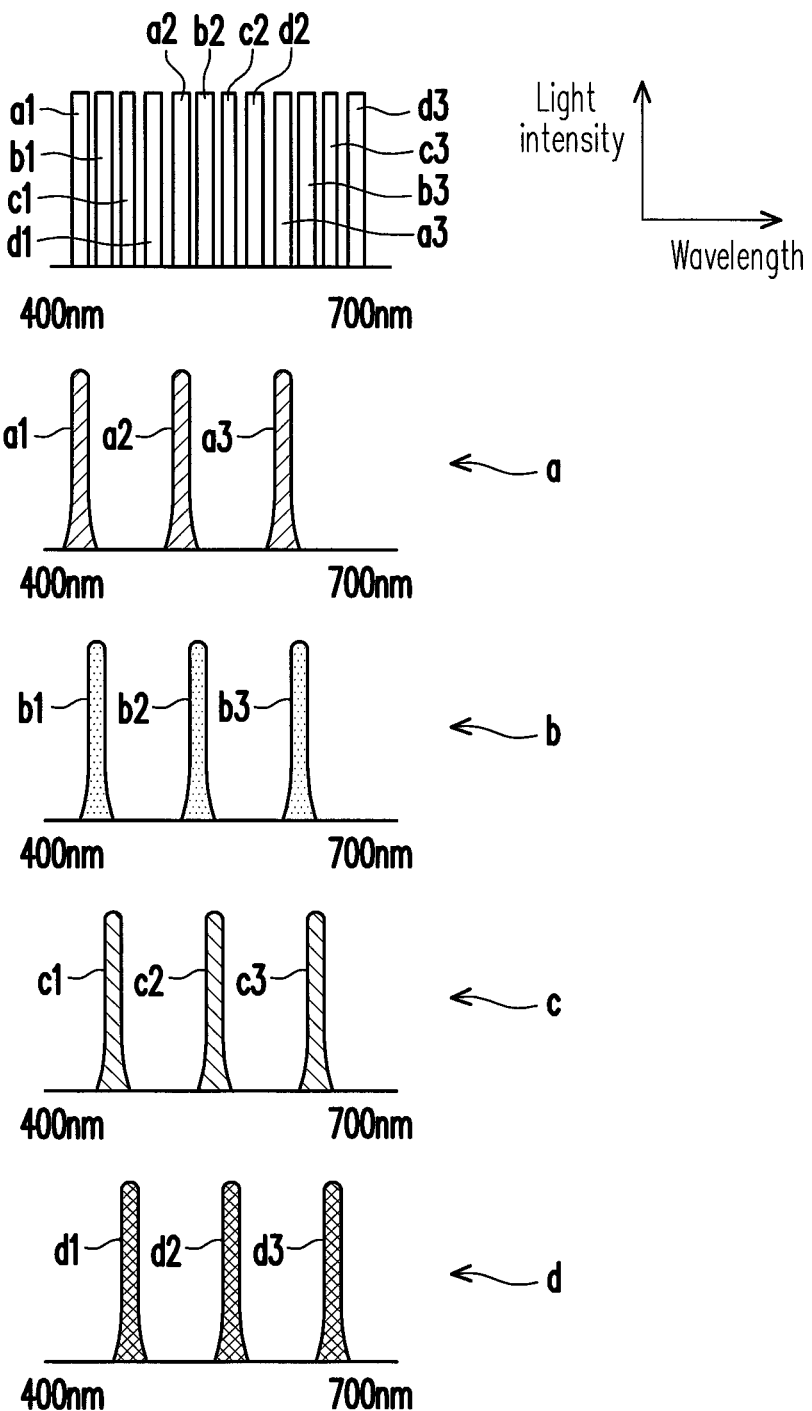
FIG. 1B is a diagram illustrating a luminescence spectrum of each set of light emitting devices in FIG. 1A.

Further, in this embodiment, the backlight module 1100 comprises four sets of light emitting devices 1110-1140, and each set of light emitting devices 1110, 1120, 1130, 1140 comprises the first color light emitting device 1111, 1121, 1131, 1141, the second color light emitting device 1112, 1122, 1132, 1142 and the third color light emitting device 1113, 1123, 1133, 1143. Reference is made to FIG. 1B as well. FIG. 1B is a diagram illustrating a luminescence spectrum of each set of light emitting devices in FIG. 1A. Four sets of light emitting devices 1110-1140 respectively correspond to luminescence spectra a, b, c, d. Primary wavelength ranges a1, b1, c1, d1 of light emitted by the first color light emitting devices 1111, 1121, 1131, 1141 are different from each other, primary wavelength ranges a2, b2, c2, d2 of light emitted by the second color light emitting devices 1112, 1122, 1132, 1142 are different from each other, and primary wavelength ranges a3, b3, c3, d3 of light emitted by the third color light emitting devices 1113, 1123, 1133, 1143 are also different from each other. In this embodiment, the primary wavelength ranges a1, b1, c1, d1, a2, b2, c2, d2, a3, b3, c3 and d3 do not partially overlap each other.

Figure 1C:
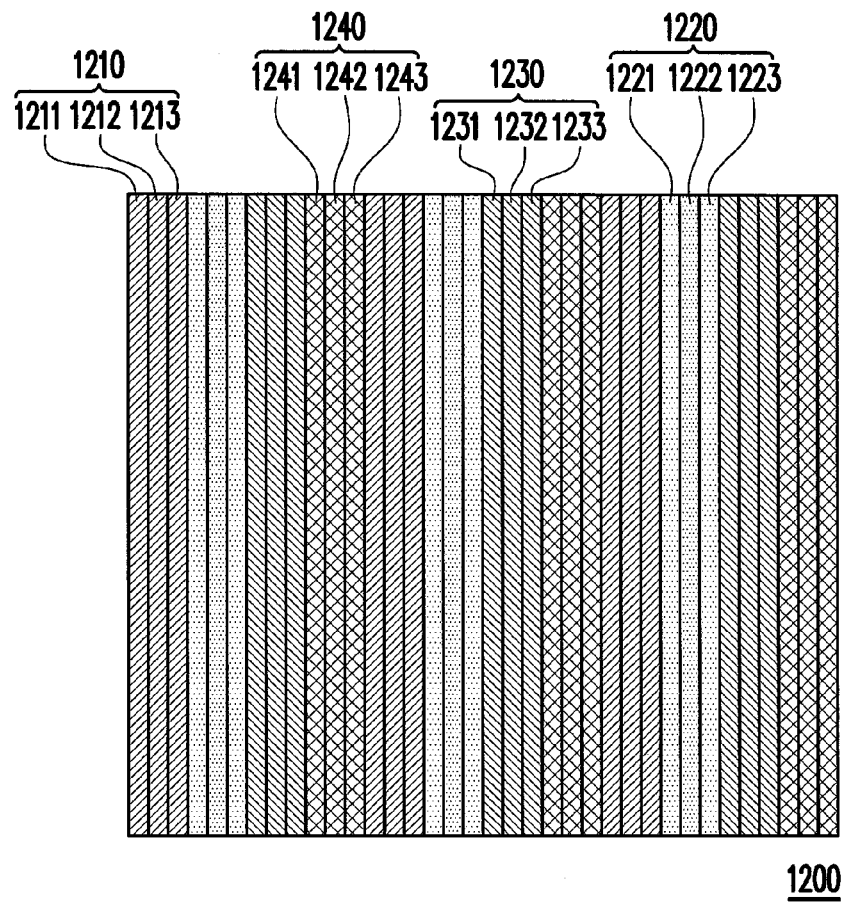
FIG. 1C is a diagram illustrating a structure of a filtering module in FIG. 1A.

FIG. 1C is a schematic top view diagram of the filtering module in FIG. 1A. Reference is made to FIG. 1C. The filtering module 1200 in this embodiment may be a wavelength filter that allows light of a corresponding wavelength to pass through and blocks light of other wavelengths. In this embodiment, the filtering module 1200 comprises a plurality of sets of filtering units 1210, 1220, 1230, 1240, and each filtering unit 1210-1240 in each set of filtering units 1210-1240 further comprises a first color filtering unit 1211, 1221, 1231, 1241, a second color filtering unit 1212, 1222, 1232, 1242 and a third color filtering unit 1213, 1223, 1233, 1243. For example, the filtering unit 1210 comprises the first color filtering unit 1211, the second color filtering unit 1212 and the third color filtering unit 1213. Every four adjacent filtering units 1210-1240 form a period, and the filtering units 1210-1240 are arranged in sequence repeatedly. Such a structure enables the light L1, L2, L3, L4 to produce striped light sources after passing through the filtering module 1200. The sets of filtering units 1210-1240 essentially respectively correspond to the sets of light emitting devices 1110-1140. Specifically, for example, primary transmission wavelength ranges of the set of filtering units 1210 are substantially consistent with primary wavelength ranges of the light L1 emitted by the set of light emitting devices 1110 or the primary transmission wavelength ranges of the set of filtering units 1210 cover the primary wavelength ranges of the light L1 emitted by the set of light emitting devices 1110, so that when the light L1 emitted by the set of light emitting devices 1110 irradiates the filtering module 1200, the light passes through the set of filtering units 1210 and is blocked by other sets of filtering units 1220-1240. More accurately, the first color light emitting devices 1111, 1121, 1131 and 1141 in the sets of light emitting devices 1110-1140 respectively pass through the first color filtering units 1211, 1221, 1231 and 1241 in the sets of filtering units 1210-1240 but are respectively blocked by other filtering units. Similarly, the second color light emitting devices 1112, 1122, 1132 and 1142 in the sets of light emitting devices 1110-1140 respectively pass through the second color filtering units 1212, 1222, 1232 and 1242 in the sets of filtering units 1210-1240 but are respectively blocked by other filtering units. The third color light emitting devices 1113, 1123, 1133 and 1143 in the sets of light emitting devices 1110-1140 respectively pass through the filtering units 1213, 1223, 1233 and 1243 in the sets of filtering units 1210-1240 but are respectively blocked by other filtering units.

Referring to FIG. 1B, in particular, a primary wavelength range of light emitted by the light emitting device of each color is defined as a wavelength range corresponding to light intensities greater than or equal to 50% of a maximum light intensity (namely, a peak value) in a luminescence spectrum of the light. In other words, the primary wavelength range is, for example, a range covered by full width at half maximum of the luminescence spectrum.

Figure 1D:
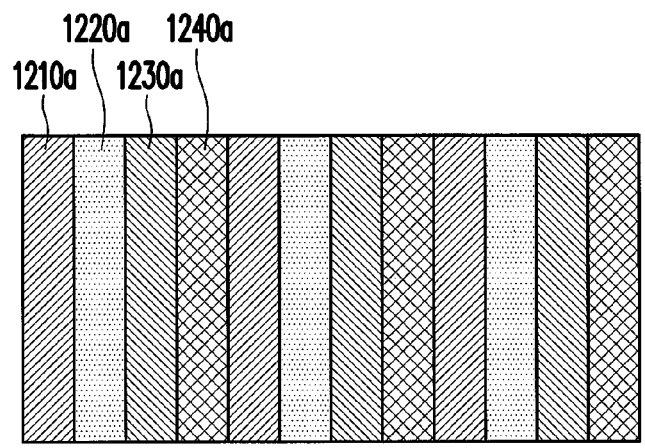
FIG. 1D is a diagram illustrating another structure of the filtering module in FIG. 1A.
Figure 1E:
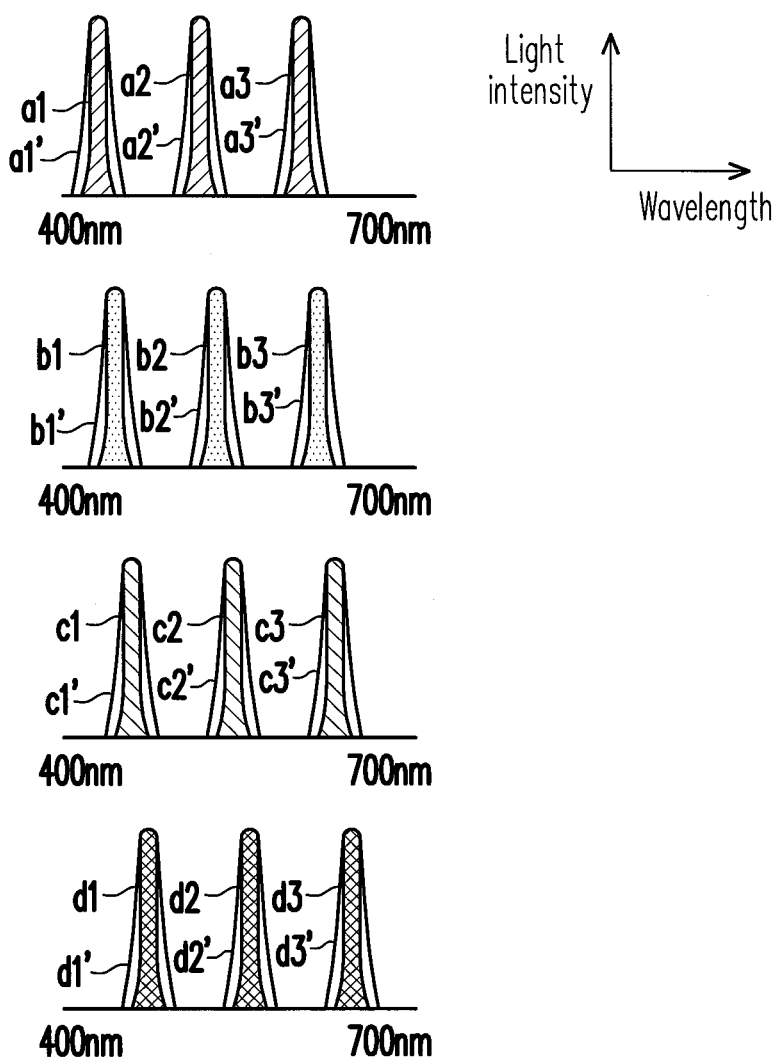
FIG. 1E is a diagram illustrating a luminescence spectrum of each set of light emitting devices in FIG. 1D.

The filtering module in this embodiment is not limited to the structure of FIG. 1C. FIG. 1D shows another variation of the filtering module in FIG. 1A. Reference is made to FIG. 1E as well. FIG. 1E is a diagram illustrating a luminescence spectrum of each set of light emitting devices in FIG. 1D. The filtering module 1200a in FIG. 1D comprises four sets of filtering units 1210a-1240a, every four adjacent filtering units 1210a-1240a form a period, and the filtering units 1210a-1240a are arranged in sequence repeatedly. Each set of filtering units 1210a-1240a has a plurality of primary transmission wavelength ranges a1'-a3', b1'-b3', c10'-c3', d1'-d3', which covers the primary wavelength range a1-d1 of the light emitted by the first color light emitting device 1111-1141, the primary wavelength range a2-d2 of the light emitted by the second color light emitting device 1112-1142 and the primary wavelength range a3-d3 of the light emitted by the third color light emitting device 1113-1143 in one set of light emitting devices 1110-1140.

For example, in FIG. 1E, the primary transmission wavelength ranges a1', a2' and a3' of the filtering unit 1210a respectively cover the primary wavelength ranges a1, a2 and a3 in the luminescence spectrum a of FIG. 1B, and the primary transmission wavelength ranges b1', b2' and b3' of the filtering unit 1220a respectively cover the primary wavelength ranges b1, b2 and b3 in the luminescence spectrum b. Therefore, the light L1, L2, L3 and L4 respectively emitted by the plurality of sets of light emitting devices 1110-1140 can respectively pass through the filtering units 1210a, 1220a, 1230a and 1240a of the filtering module 1200a in FIG. 1D. In addition, in this embodiment, the primary transmission wavelength ranges a1', b1', c1', d1', a2', b2', c2', d2', a3', b3', c3' and d3' do not partially overlap each other.

The above primary transmission wavelength range is defined as a wavelength range corresponding to transmittances greater than or equal to 50% of a maximum transmittance (namely, a peak value) in a transmission spectrum. In other words, the primary transmission wavelength range is, for example, a range covered by full width at half maximum of the transmission spectrum. However, in other embodiments, when a slope of the transmission spectrum of the filtering unit may be sharp due to parameter adjustment, since the capability of the filtering unit for filtering light of different wavelengths is increased, the primary wavelength range of the luminescence spectrum of the light emitting device may be defined as a wavelength range corresponding to light intensities greater than and equal to X % of the maximum light intensity (namely, the peak value) in the luminescence spectrum, where X is greater than 50 (for example, X=70), and curves of two adjacent luminescence spectra may be closer without causing the primary wavelength ranges to partially overlap. Alternatively, in order to reduce the crosstalk phenomenon so as to improve the quality of a stereoscopic image, the value of X may also be smaller than 50 (for example, X=30 or 10), and then curves of two adjacent luminescence spectra need to be farther from each other so that the primary wavelength ranges do not partially overlap. Similarly, the primary transmission wavelength range of the filtering unit may also be defined as a wavelength range corresponding to transmittances greater than or equal to Y % of the maximum transmittance (namely, the peak value) in the transmission spectrum. When the slope of the transmission spectrum may be sharp due to parameter adjustment, Y may be greater than 50 (for example, Y=70), and curves of two adjacent transmission spectra may be close to each other without causing the primary wavelength ranges to partially overlap. On the other hand, when Y is smaller than 50 (for example, Y=30 or 10), curves of two adjacent transmission spectra need to be farther from each other so that the primary transmission wavelength ranges do not partially overlap, thereby reducing the crosstalk phenomenon.

Referring back to FIG. 1A, the light emitting devices 1111-1113, 1121-1123, 1131-1133, 1141-1143 in the backlight module 1100 shown in the figure are just shown schematically. Actually, in this embodiment, a plurality of light emitting devices exists for each luminescence wavelength, light emitting devices of different luminescence wavelengths are arranged alternately, and light emitting devices of all luminescence wavelengths are distributed on one plane. To achieve uniform light emission, a diffusion plate 1500 may further be disposed between the filtering module 1200 and the backlight module 1100, so that the light L1, L2, L3 and L4 emitted by various sets of light emitting devices can be distributed to the filtering module 1200 more uniformly. In addition, in another embodiment, the backlight module 1100 may also be a side type backlight module using a light guide plate for guiding light, each set of light emitting devices 1110-1140 is disposed on at least one side of the light guide plate, the light guide plate is disposed on one side of the filtering module 1200, and the light guide plate guides the light L1, L2, L3 and L4 from the side to the front of the light guide plate and transmits the light to the filtering module 1200. In this embodiment, the display panel 1300 may be a liquid crystal panel. Referring to FIG. 1A, the display panel 1300 comprises a plurality of sets of pixels 11, 22, 33 and 44. Each set of pixels 11, 22, 33, 44 comprises a plurality of pixels 11, 22, 33, 44, and the pixels 11, 22, 33 and 44 are arranged sequentially and repeatedly. For example, the set of pixels 11 comprises a plurality of pixels 11, and the set of pixels 22 comprises a plurality of pixels 22. However, the disclosure is not limited to this, and the number of sets of pixels comprised in the display panel 1300 may also be adjusted according to use requirements in other embodiments.

Figure 1F:
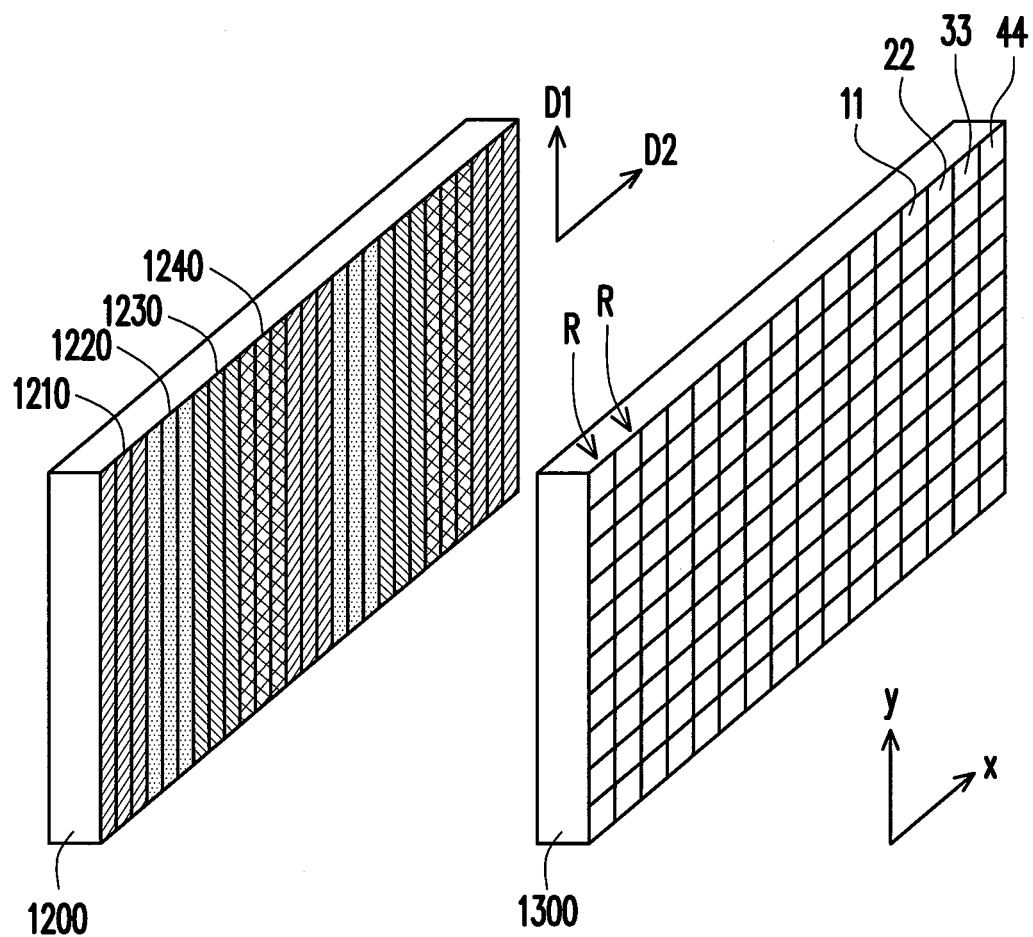
FIG. 1F is a schematic diagram illustrating a relative relationship between the filtering module and a display panel in FIG. 1A.

FIG. 1F is a schematic diagram illustrating a relative relationship between the filtering module and the display panel in FIG. 1A, in which exemplary illustration is made with the filtering module in FIG. 1C. Referring to FIG. 1F, in this embodiment, each set of filtering units 1210-1240 in the filtering module 1200 extends in a first direction D1 and is arranged in a second direction D2, that is, for example, extends in a direction y in FIG. 1F and is arranged in a direction x in FIG. 1F. In this embodiment, the first direction D1 is substantially perpendicular to the second direction D2. The display panel 1300 has a plurality of pixel rows R, a plurality of pixels 11, 22, 33 or 44 in each pixel row R is arranged in the direction y in FIG. 1F, and the pixel rows R are arranged in the direction x in FIG. 1F. In this embodiment, the first direction D1 is substantially parallel to the arrangement direction of the pixels 11, 22, 33 or 44 in each pixel row R. In other words, in this embodiment, each set of filtering units 1210-1240 in the filtering module 1200 is disposed parallel to the arrangement of the pixels 11, 22, 33 or 44 in each pixel row R on the display panel 1300. However, the relative relationship between the filtering module and the display panel in this embodiment is not limited to this, and two other implementation manners will be exemplified below.

Figure 1G:
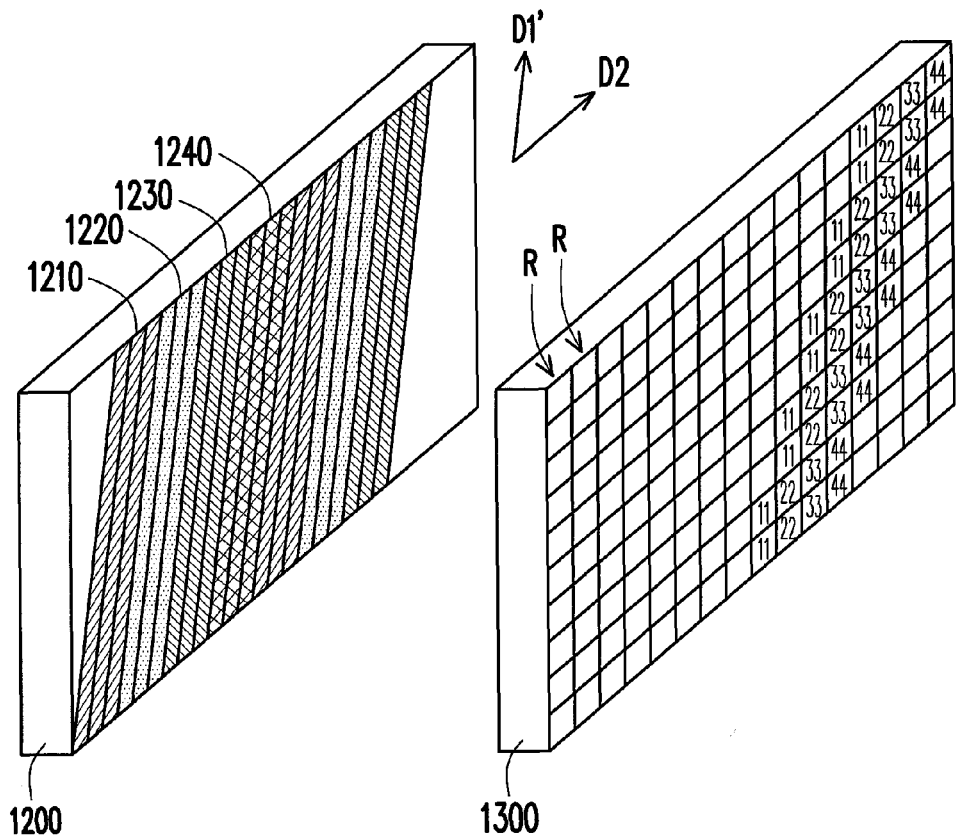
FIG. 1G is a schematic diagram illustrating a second relative relationship between the filtering module and the display panel in FIG. 1A.

FIG. 1G is a schematic diagram illustrating another relative relationship between the filtering module and the display panel in FIG. 1A. In FIG. 1G, each set of filtering units 1210-1240 may extend in an inclined direction, that is, a first direction Dr (namely, an extension direction) of each set of filtering units 1210-1240 is inclined with respect to each pixel row R. In addition, each set of pixels 11, 22, 33, 44 in this embodiment is also arranged in an inclined manner with respect to each pixel row R. In other words, the first direction D1' (namely, the extension direction) of each set of filtering units 1210-1240 is parallel to the arrangement direction of each set of pixels 11, 22, 33, 44.

Figure 1H:
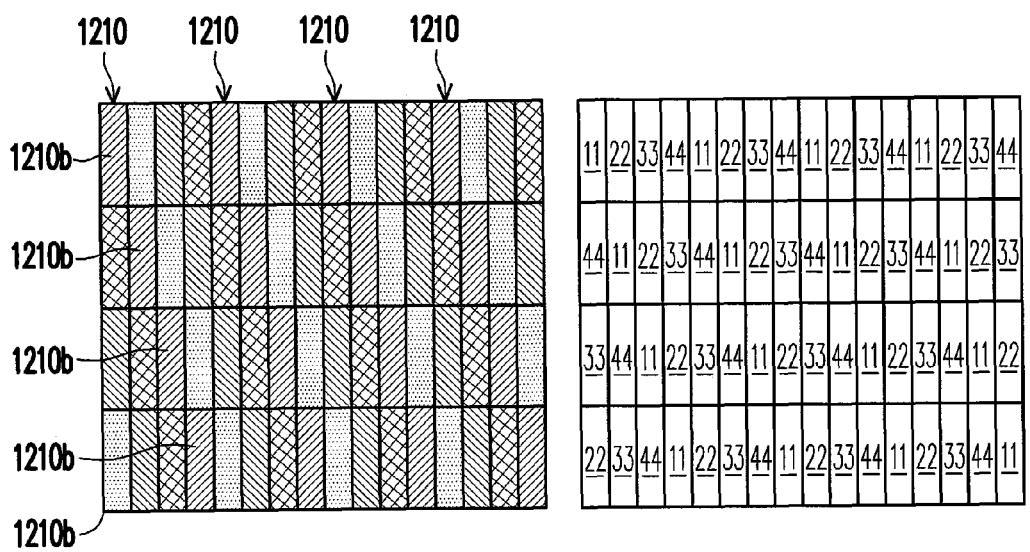
FIG. 1H is a schematic diagram illustrating a third relative relationship between the filtering module and the display panel in FIG. 1A.

FIG. 1H is a schematic diagram illustrating still another relative relationship between the filtering module and the display panel in FIG. 1A. In FIG. 1H, each filtering unit 1210-1240 comprises a plurality of filtering sub-units 1210b, and the filtering sub-units 1210b are arranged in an inclined direction, for example, arranged stepwise in an inclined direction. FIG. 1H exemplarily shows the arrangement of the filtering units 1210 in one set of filtering units 1210 relative to the pixels 11, 22, 33, 44. In this embodiment, each pixel 11, 22, 33, 44 is also arranged in an inclined direction, for example, arranged stepwise in an inclined direction.

Then, still referring back to FIG. 1A, FIG. 1A further exemplarily shows the situation that the light L1 emitted by the set of light emitting devices 1110 irradiates the filtering module 1200. In particular, the light L1 emitted by the set of light emitting devices 1110 passes through the set of filtering units 1210 in the filtering module 1200 with a periodic structure, and then impinges on the pixels 11, 22, 33, 44 on the display panel 1300. The pixels 11, 22, 33, 44 on the display panel 1300 are responsible for displaying parts of images of different viewing angles. Specifically, with the special counterpoint design of the filtering module 1200 and the display panel 1300, the light L1 output from a plurality of filtering units 1210 passes through a plurality of pixels 11, 22, 33, 44 on the display panel 1300 and then displays four images I1, I2, I3, I4 of different viewing angles in four viewing zones V1, V2, V3, V4.

Figure 2:
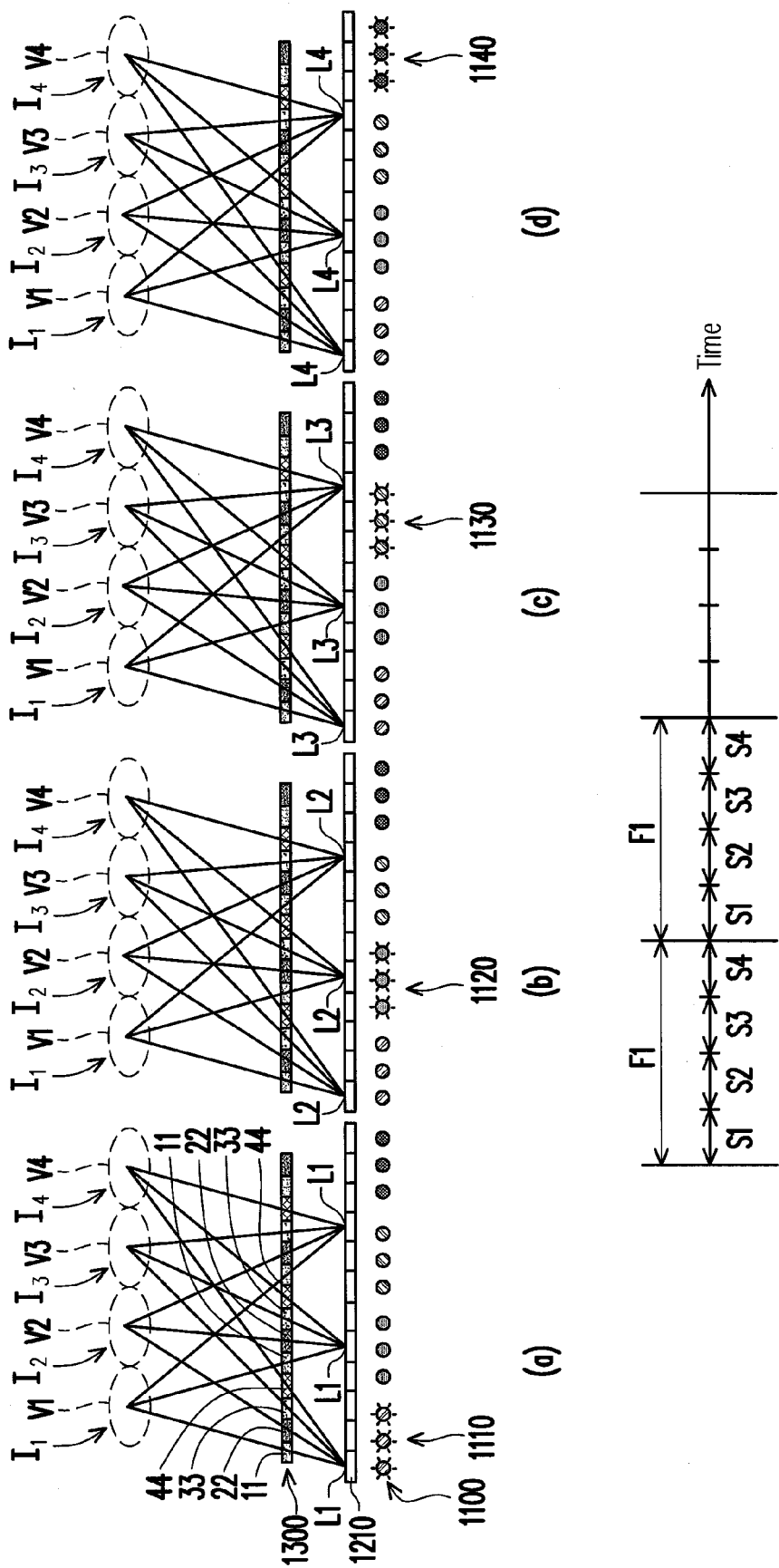
FIGS. 2(a) to 2(d) are schematic dynamic diagrams of displaying frames by the display apparatus in FIG. 1A.
FIG. 2(e) is a timing diagram of displaying frames by the display apparatus in FIG. 1A.

Drawings (a)-(d) in FIG. 2 are schematic dynamic diagrams of displaying frames by the display apparatus in FIG. 1A. In this embodiment, the backlight module 1100 turns on a plurality of sets of light emitting devices 1110-1140 by turns, and drawings (a)-(d) show the situations of turning on various sets of light emitting devices 1110, 1120, 1130, 1140 by turns. Drawing (e) is a timing diagram of displaying frames by the display apparatus in FIG. 1A. Referring to drawing (e), in this embodiment, the time required for the display apparatus 1000 to display each frame is a frame time F1, and each frame time F1 comprises four sub-frame times S1-S4. Specifically, drawings (a)-(d) respectively show the situations of presentation in the sub-frame times S1-S4. However, the disclosure is not limited to this, and the number of the sub-frame times may be adjusted according to a frame presentation mode.

In particular, drawing (a) corresponds to the sub-frame time S1. In the sub-frame time S1, the backlight module 1100 turns on one set of light emitting devices 1110. When one set of light emitting devices 1110 is turned on, due to the function of the filtering module 1200, the light L1 passes through one set of filtering units 1210 in the filtering module 1200, passes through a plurality of sets of pixels 11, 22, 33, 44 on the display panel 1300, and then respectively impinges on four viewing zones V1, V2, V3, V4. Specifically, the light L1 passes through a plurality of pixels 11 and then reaches the viewing zone V1, the light L1 passes through a plurality of pixels 22 and then reaches the viewing zone V2, the light L1 passes through a plurality of pixels 33 and then reaches the viewing zone V3, and the light L1 passes through a plurality of pixels 44 and then reaches the viewing zone V4. In addition, the plurality of pixels 11, 22, 33, 44 respectively displays parts of four images I1, I2, I3, I4 of different viewing angles in the four viewing zones V1, V2, V3, V4.

Then, drawing (b) corresponds to the sub-frame time S2. In the sub-frame time S2, the backlight module 1100 turns on one set of light emitting devices 1120. When the set of light emitting devices 1120 is turned on, due to the function of the filtering module 1200, the light L2 passes through one set of filtering units 1220 in the filtering module 1200, passes through a plurality of sets of pixels 22, 33, 44, 11 on the display panel 1300, and then respectively impinges on four viewing zones V1, V2, V3, V4. At this time, different from the sub-frame time S1, the light L2 passes through a plurality of pixels 22 and then reaches the viewing zone V1, the light L2 passes through a plurality of pixels 33 and then reaches the viewing zone V2, the light L2 passes through a plurality of pixels 44 and then reaches the viewing zone V3, and the light L2 passes through a plurality of pixels 11 and then reaches the viewing zone V4. In addition, the plurality of pixels 22, 33, 44, 11 respectively displays parts of four images I1, I2, I3, I4 of different viewing angles in the four viewing zones V1, V2, V3, V4.

Then, drawing (c) corresponds to the sub-frame time S3. In the sub-frame time S3, the backlight module 1100 turns on one set of light emitting devices 1130. When the set of light emitting devices 1130 is turned on, due to the function of the filtering module 1200, the light L3 passes through the set of filtering units 1230 in the filtering module 1200, passes through a plurality of sets of pixels 33, 44, 11, 22 on the display panel 1300, and then respectively impinges on four viewing zones V1, V2, V3, V4. In particular, the light L3 passes through a plurality of pixels 33 and then reaches the viewing zone V1, the light L3 passes through a plurality of pixels 44 and then reaches the viewing zone V2, the light L3 passes through a plurality of pixels 11 and then reaches the viewing zone V3, and the light L3 passes through a plurality of pixels 22 and then reaches the viewing zone V4. In addition, the plurality of pixels 33, 44, 11, 22 respectively displays parts of four images I1, I2, I3, I4 of different viewing angles in the four viewing zones V1, V2, V3, V4.

Then, drawing (d) corresponds to the sub-frame time S4. In the sub-frame time S4, the backlight module 1100 turns on one set of light emitting devices 1140. When the set of light emitting devices 1140 is turned on, due to the function of the filtering module 1200, the light L4 passes through the set of filtering units 1240 in the filtering module 1200, passes through a plurality of sets of pixels 44, 11, 22, 33 on the display panel 1300, and then respectively impinges on four viewing zones V1, V2, V3, V4. Specifically, the light L4 passes through a plurality of pixels 44 and then reaches the viewing zone V1, the light L4 passes through a plurality of pixels 11 and then reaches the viewing zone V2, the light L4 passes through a plurality of pixels 22 and then reaches the viewing zone V3, and the light L4 passes through a plurality of pixels 33 and then reaches the viewing zone V4. In addition, the plurality of pixels 44, 11, 22, 33 respectively displays parts of four images I1, I2, I3, I4 of different viewing angles in the four viewing zones V1, V2, V3, V4.

By combining the parts of the four images I1, I2, I3, I4 of different viewing angles in the four sub-frame times S1-S4, four complete images I1, I2, I3, I4 of different viewing angles in one frame time F1 are formed, and a dynamic image can be presented when a plurality of frame times F1 pass. For the image I1 of a viewing angle appearing in the viewing zone V1, a plurality of pixels 11 provides a part of the image I1 of a viewing angle in the sub-frame time S1, and in sequence, a plurality of pixels 22 provides a part of the image I1 of a viewing angle in the sub-frame time S2, a plurality of pixels 33 provides a part of the image I1 of a viewing angle in the sub-frame time S3, and a plurality of pixels 44 provides a part of the image I1 of a viewing angle in the sub-frame time S4; therefore, when one complete frame time F1 passes, images displayed in the four sub-frame times S1-S4 form a complete image I1 of a viewing angle to be displayed in the viewing zone V1. Since the image I1, I2, I3, I4 of a viewing angle in each viewing zone V1, V2, V3, V4 is provided by a plurality of pixels 11, 22, 33, 44 at different positions, the resolution of the image is not reduced due to multiple viewing zones V1, V2, V3, V4.

In this embodiment, four images I1, I2, I3, I4 of different viewing angles are displayed in four viewing zones V1, V2, V3, V4. For example, in case of viewing by human eyes in the viewing zones V1 and V2, images I1 and I2 of two viewing angles are respectively projected into two eyes, so as to produce a stereoscopic (three-dimensional) image of an object in the brain, while in case of viewing in the viewing zones V3 and V4, another stereoscopic (three-dimensional) image of the object may be obtained. Therefore, the display apparatus 1000 of this embodiment can display a stereoscopic (three-dimensional) image of an object, and the appearance of the object of different viewing angles can be seen when viewing at different positions. In other words, various angles of a stereoscopic (three-dimensional) object can be viewed, thereby having lots of fun. In addition, in this embodiment, the number of the viewing zones and the viewing angles is not limited to this and may be adjusted according to the designer's requirements.

In this embodiment, four images of the same viewing angle may also be displayed in four viewing zones V1, V2, V3, V4, so as to form a planar (two-dimensional) image. Since the planar image and the stereoscopic image are both formed by a plurality of pixels 11, 22, 33, 44 at different positions on the display panel 1300, the resolution of the stereoscopic (three-dimensional) image and the resolution of the planar (two-dimensional) image are both full resolution, and the brightness of the stereoscopic (three-dimensional) image and the brightness of the planar (two-dimensional) image are also the same.

Figure 3:
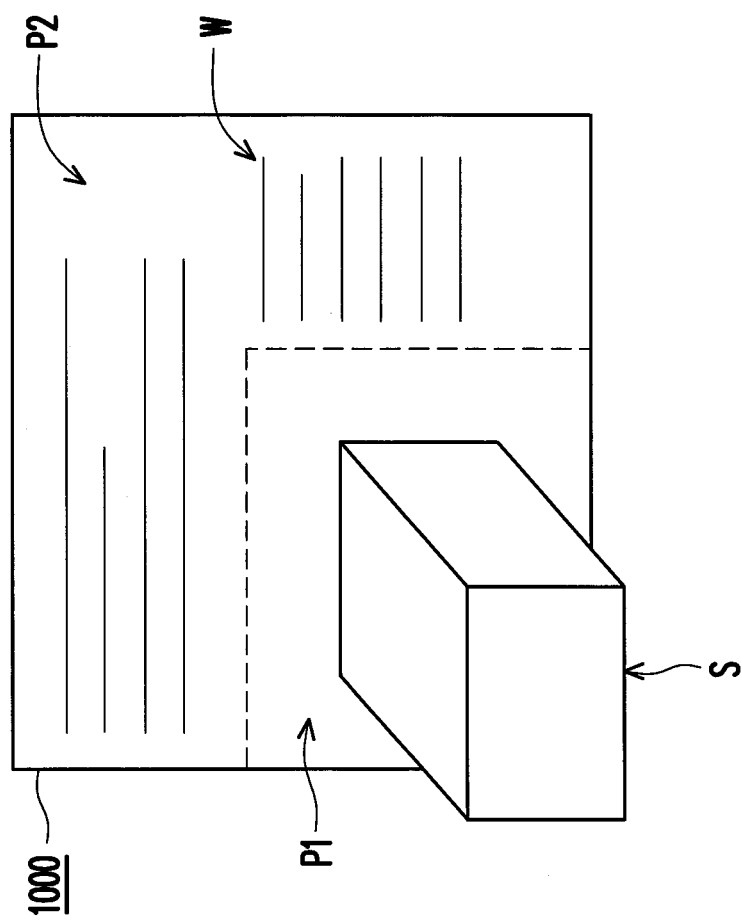
FIG. 3 shows an image displayed by the display apparatus in FIG. 1A in a mode.

FIG. 3 shows an image displayed by the display apparatus in FIG. 1A in a mode. In such a mode, the display apparatus in FIG. 1A can display a planar (two-dimensional) image and a stereoscopic (three-dimensional) image at the same time. To present more diversified variation, in the embodiment of FIG. 1A, the display panel may be divided into a plurality of regions, for example, a first region P1 and a second region P2. The first region P1 can display images of different viewing angles in different sub-frame times S1-S4 of each frame time F1, while the second region P2 can display images of the same viewing angle in different sub-frame times S1-S4 of each frame time F1. In this way, the first region P1 displays a stereoscopic (three-dimensional) image, while the second region P2 displays a planar (two-dimensional) image, that is, for example, the first region P1 presents a stereoscopic object S, while the second region P2 presents a planar word W or planar picture. In other words, the display apparatus 1000 of this embodiment can also output planar (two-dimensional) and stereoscopic (three-dimensional) multi-region frames at the same time.

Figure 4:
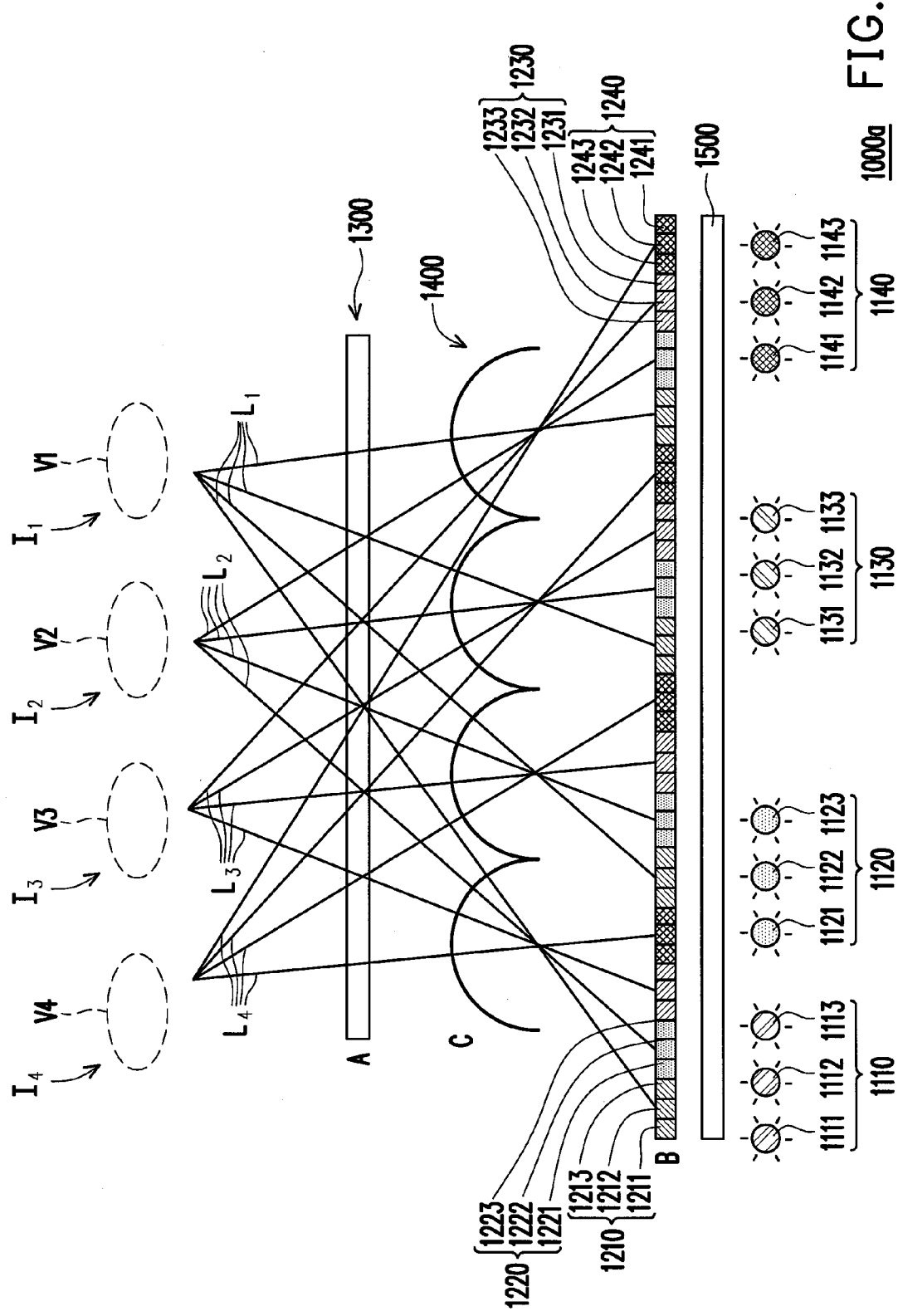
FIG. 4 is a schematic diagram of a display apparatus according to another exemplary embodiment.

FIG. 4 is a schematic diagram of a display apparatus according to another exemplary embodiment. The display apparatus 1000a in FIG. 4 and the display apparatus 1000 in FIG. 1A are similar, and the main difference between them lies in that the display apparatus 1000a of this embodiment further comprises a light directing device 1400 disposed between the filtering module 1200 and the display panel 1300, in which the light directing device 1400 can direct light L1, L2, L3, L4 passing through the filtering module 1200 to different viewing zones V1, V2, V3, V4.

Figure 5A:
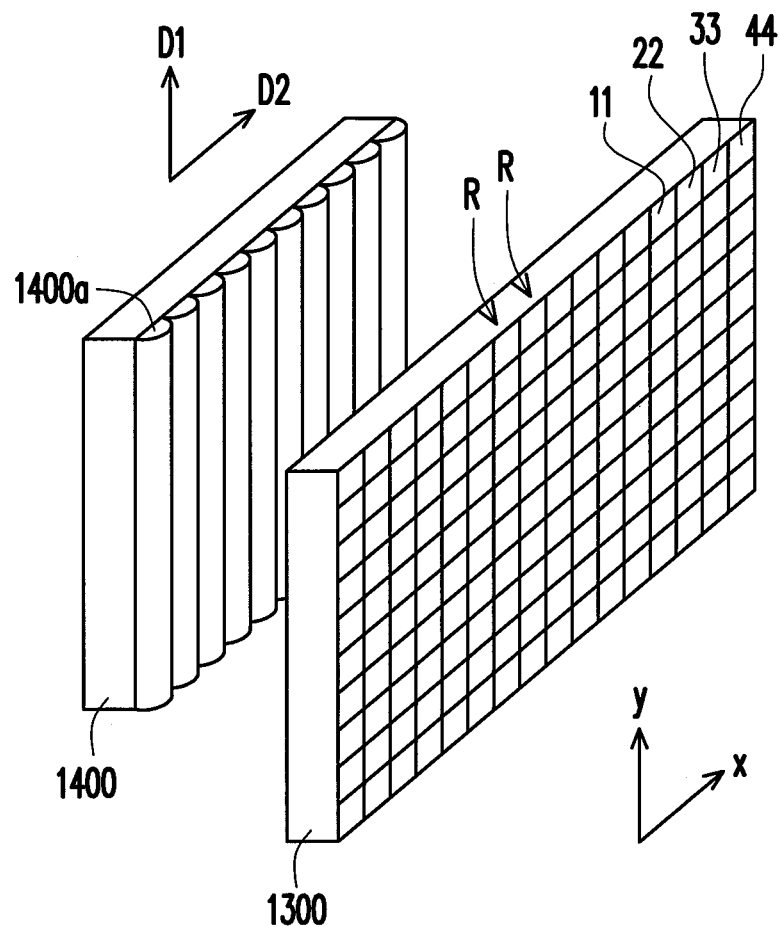
FIG. 5A is a diagram illustrating a relative relationship between a light directing device and a display panel in FIG. 4.

FIG. 5A is diagram illustrating a relative relationship between the light directing device and a display panel in FIG. 4. In the display apparatus 1000a of this embodiment, the light directing device 1400 comprises a plurality of optical structures 1400a in periodic arrangement, and each optical structure 1400a extends in a first direction D1 and is arranged in a second direction D2, that is, for example, extends in a direction y in FIG. 5A and is arranged in a direction x in FIG. 5A. In this embodiment, the first direction D1 is substantially perpendicular to the second direction D2. Each optical structure 1400a may be a lenticular lens. On the other hand, the display panel 1300 in FIG. 5A has a plurality of pixel rows R, a plurality of pixels 11, 22, 33 or 44 in each pixel row R is arranged in the direction y in FIG. 5A, and the pixel rows R are arranged in the direction x in FIG. 5A. In this embodiment, the first direction D1 is substantially parallel to the arrangement direction of the pixels 11, 22, 33 or 44 in each pixel row R. In other words, the plurality of optical structures 1400a of the light directing device 1400 is disposed parallel to the arrangement of the pixels 11, 22, 33 or 44 in each pixel row R on the display panel 1300.

Figure 5B:
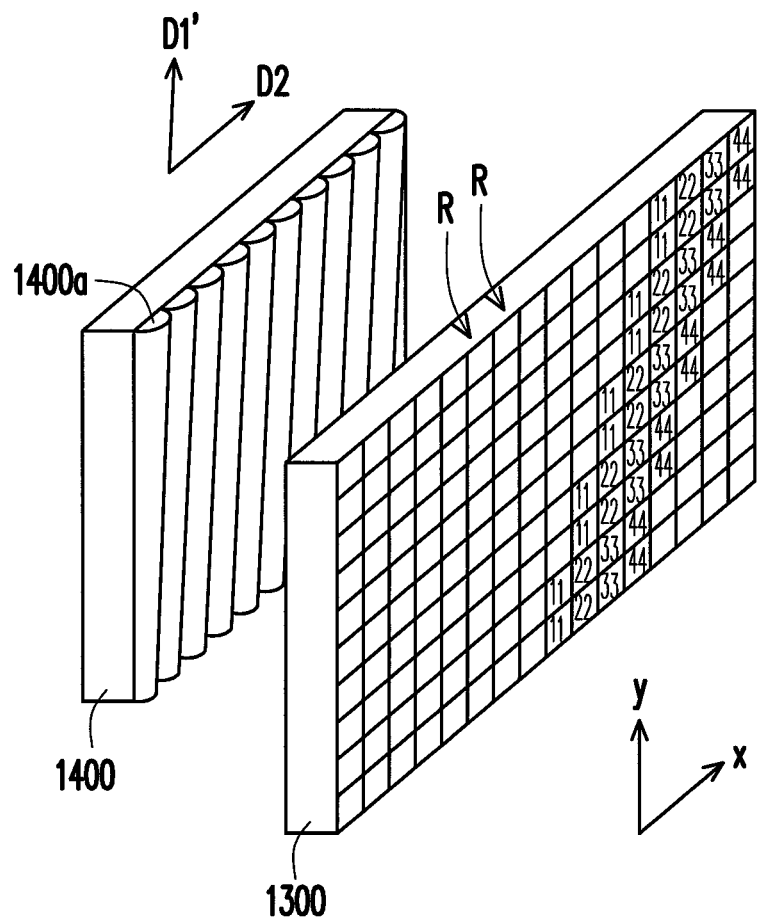
FIG. 5B is a diagram illustrating another relative relationship between the light directing device and the display panel in FIG. 4.

However, the relative relationship between the filtering module and the display panel in this embodiment is not limited to this. FIG. 5B shows another relative relationship. The plurality of optical structures 1400a of the light directing device 1400 In FIG. 5B may be disposed to extend in an inclined direction, that is, a first direction D1' (namely, an extension direction) of each optical structure 1400a is inclined with respect to each pixel row R. In addition, each set of pixels 11, 22, 33, 44 in this embodiment is also arranged in an inclined manner with respect to each pixel row R. In other words, the first direction D1' (namely, the extension direction) of each optical structure 1400a is parallel to the arrangement direction of each set of pixels 11, 22, 33, 44.

Figure 6:
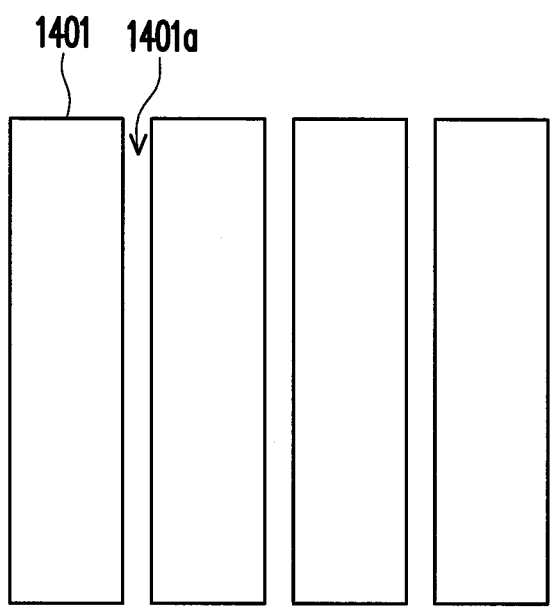
FIG. 6 is a schematic diagram of a light directing device according to another exemplary embodiment.

In addition, the light directing device 1400 in the display apparatus 1000a of this embodiment is not limited to the above lenticular lens. FIG. 6 is a schematic diagram of a light directing device according to another exemplary embodiment. The light directing device 1401 of this embodiment may be a parallax barrier, and each optical structure 1401a of the light directing device 1401 is a slit. As described in the embodiment of FIG. 5A and FIG. 5B, the optical structure 1401a may be disposed parallel to the arrangement direction of each set of pixels 11, 22, 33, 44 on the display panel 1300, in which the arrangement direction of each set of pixels 11, 22, 33, 44 may be parallel to or inclined with respect to each pixel row R. In other words, for example, each slit extends in a direction parallel to each pixel row R on the display panel 1300 or extends in a direction inclined with respect to each pixel row R.

Referring back to FIG. 4, the light emitting devices 1111-1113, 1121-1123, 1131-1133, 1141-1143 in the backlight module 1100 shown in the figure are just shown schematically. Actually, in this embodiment, a plurality of light emitting devices exists for each luminescence wavelength, light emitting devices of different luminescence wavelengths are arranged alternately, and light emitting devices of all the luminescence wavelengths are distributed on one plane. In addition, in this embodiment, a pitch of the plurality of optical structures 1400a of the light directing device 1400 is designed depending on a pitch of the light L1, L2, L3, L4 output from the filtering module, and a pitch of a plurality of sets of filtering units 1210-1240 in the filtering module 1200 in this embodiment can be reduced by adjusting process parameters, so that the pitch of the light L1, L2, L3, L4 emitted by the plurality of sets of light emitting devices 1110-1140 decreases, and thus the pitch of the plurality of optical structures 1400a of the light directing device 1400 can be set to be smaller. In this way, the chance of observing fine stripes produced by the plurality of optical structures 1400a when an image is viewed can be reduced.

Different from the display apparatus 1000 in FIG. 1A, in this embodiment, the light L1, L2, L3, L4 emitted by the plurality of sets of light emitting devices 1110-1140 respectively passes through a plurality of sets of corresponding filtering unit 1210-1240 and then impinges on all pixels on the entire display panel 1300, and there is no obvious corresponding relationship between the light and the pixels. For example, the light L1 emitted by the set of light emitting devices 1110 passes through a plurality of sets of filtering units 1210 in the filtering module 1200, impinges on the entire display panel 1300 through the light directing device 1400, and then presents an image in the viewing zone V1. Similarly, the light L2 emitted by the set of light emitting devices 1120 passes through a plurality of sets of filtering units 1220 in the filtering module 1200, impinges on the entire display panel 1300 through the light directing device 1400, and then presents an image in the viewing zone V2. The light L3 emitted by the set of light emitting devices 1130 passes through a plurality of sets of filtering units 1230 in the filtering module 1200, impinges on the entire display panel 1300 through the light directing device 1400, and then presents an image in the viewing zone V3. The light L4 emitted by the set of light emitting devices 1140 passes through a plurality of sets of filtering units 1240 in the filtering module 1200, impinges on the entire display panel 1300 through the light directing device 1400, and then presents an image in the viewing zone V4. Therefore, images in all the viewing zones V1, V2, V3, V4 all have full resolution.

FIG. 4 shows the situation that all the plurality of sets of light emitting devices 1110-1140 emits light, namely, L1, L2, L3, L4, which serves as a reference. FIG. 7 to FIG. 10 are schematic dynamic diagrams of displaying frames by the display apparatus in FIG. 4. In this embodiment, the backlight module 1100 turns on a plurality of sets of light emitting devices 1110-1140 by turns, and FIG. 7 to FIG. 10 show the situations of turning on various sets of light emitting devices 1110-1140 by turns. Referring to drawing (e) of FIG. 2, in this embodiment, the time required for the display apparatus 1000a to display each frame is a frame time F1, and each frame time F1 comprises four sub-frame times S1-S4, Specifically, FIG. 7 to FIG. 10 respectively show the situations of presentation in the sub-frame times S1-S4. However, the disclosure is not limited to this, and the number of the sub-frame times may be adjusted according to a frame presentation mode.

Figure 7:
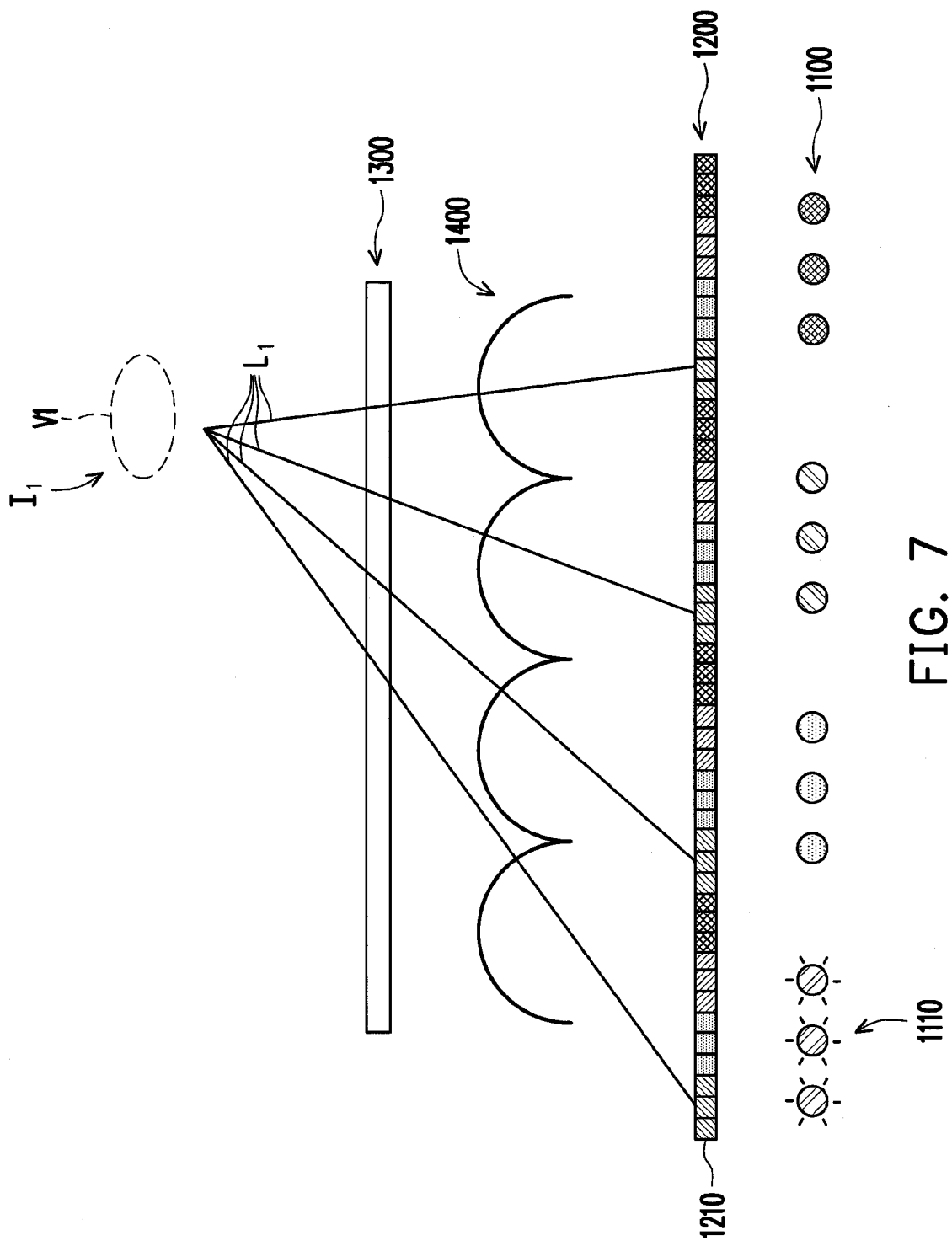
FIGS. 7 to 10 are schematic dynamic diagrams of displaying frames by the display apparatus in FIG. 4.

In particular, FIG. 7 corresponds to the sub-frame time S1. In the sub-frame time S1, the backlight module 1100 turns on one set of light emitting devices 1110. When the set of light emitting devices 1110 is turned on, due to the function of the filtering module 1200, the light L1 passes through a plurality of sets of filtering units 1210 in the filtering module 1200, passes through pixels on the entire display panel 1300, and then reaches the viewing zone V1. Further, the pixels on the display panel 1300 display a complete image I1 of a viewing angle in the viewing zone V1.

Figure 8:
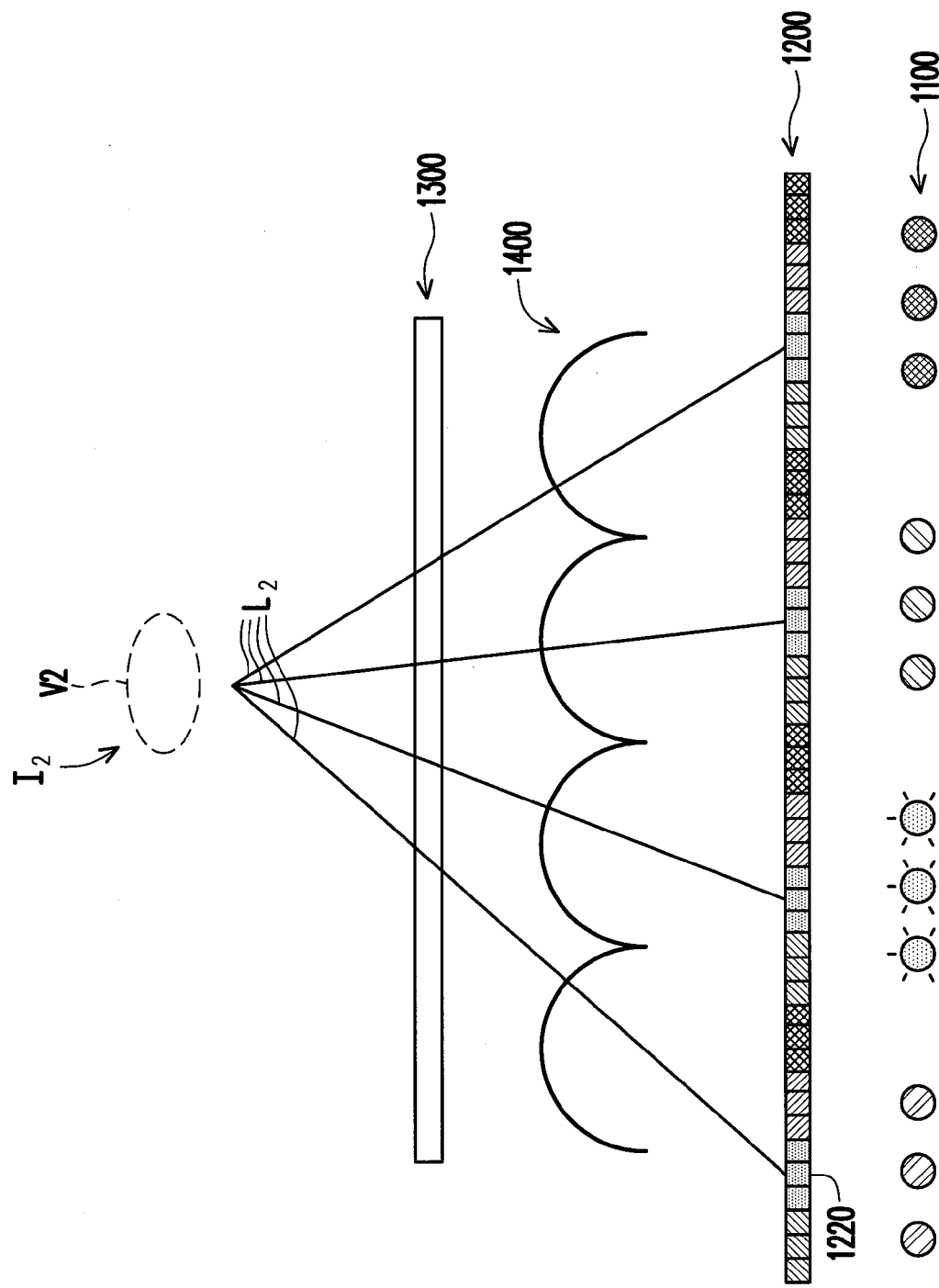

Then, FIG. 8 corresponds to the sub-frame time S2. In the sub-frame time S2, the backlight module 1100 turns on one set of light emitting devices 1120. When the set of light emitting devices 1120 is turned on, due to the function of the filtering module 1200, the light L2 passes through a plurality of sets of filtering units 1220 in the filtering module 1200, passes through pixels on the entire display panel 1300, and then reaches the viewing zone V2. Further, the pixels on the display panel 1300 display a complete image I2 of a viewing angle in the viewing zone V2.

Figure 9:
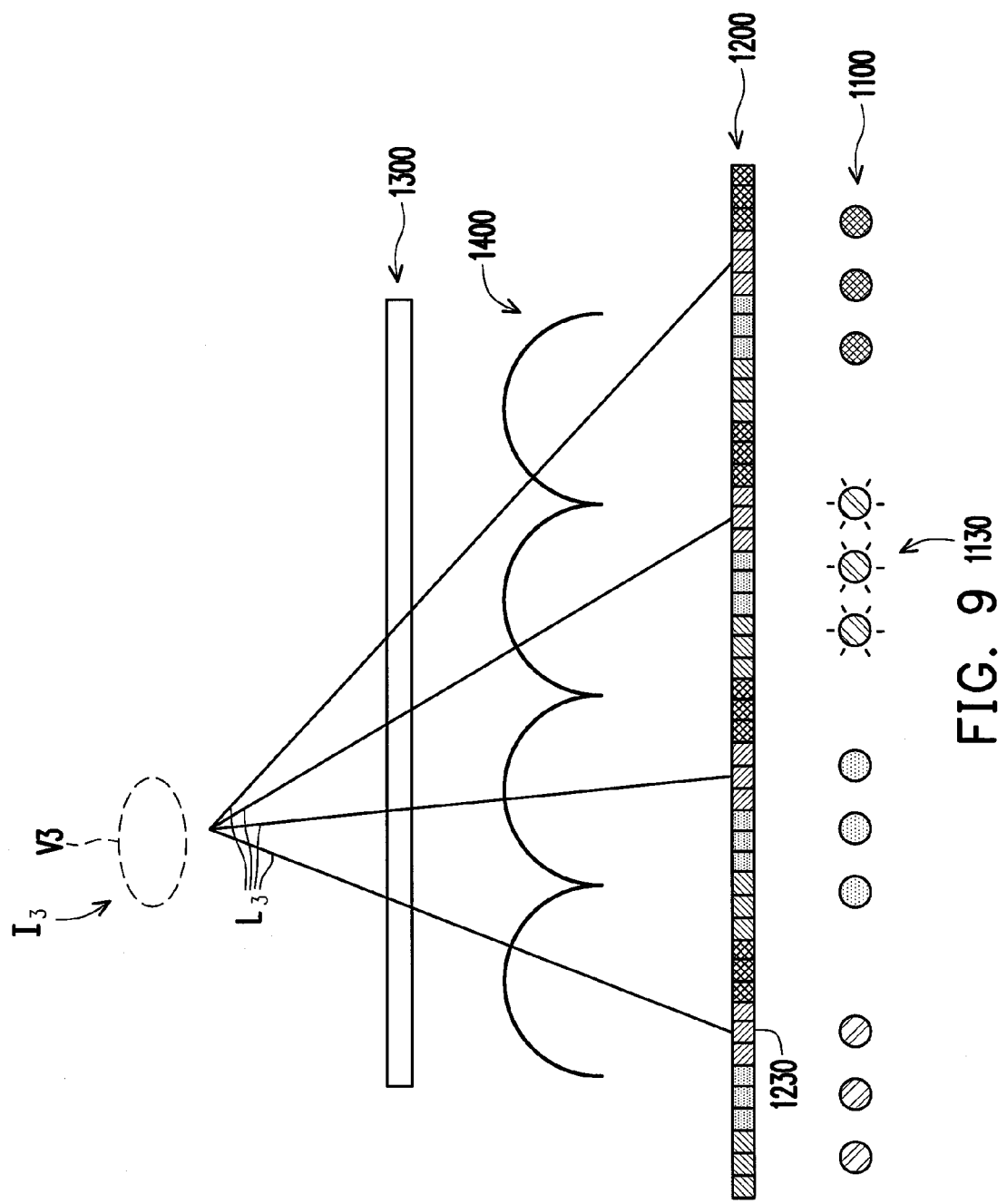

Then, FIG. 9 corresponds to the sub-frame time S3. In the sub-frame time S3, the backlight module 1100 turns on one set of light emitting devices 1130. When the set of light emitting devices 1130 is turned on, due to the function of the filtering module 1200, the light L3 passes through a plurality of sets of filtering units 1230 in the filtering module 1200, passes through pixels on the entire display panel 1300, and then reaches the viewing zone V3. Further, the pixels on the display panel 1300 display a complete image I3 of a viewing angle in the viewing zone V3.

Figure 10:
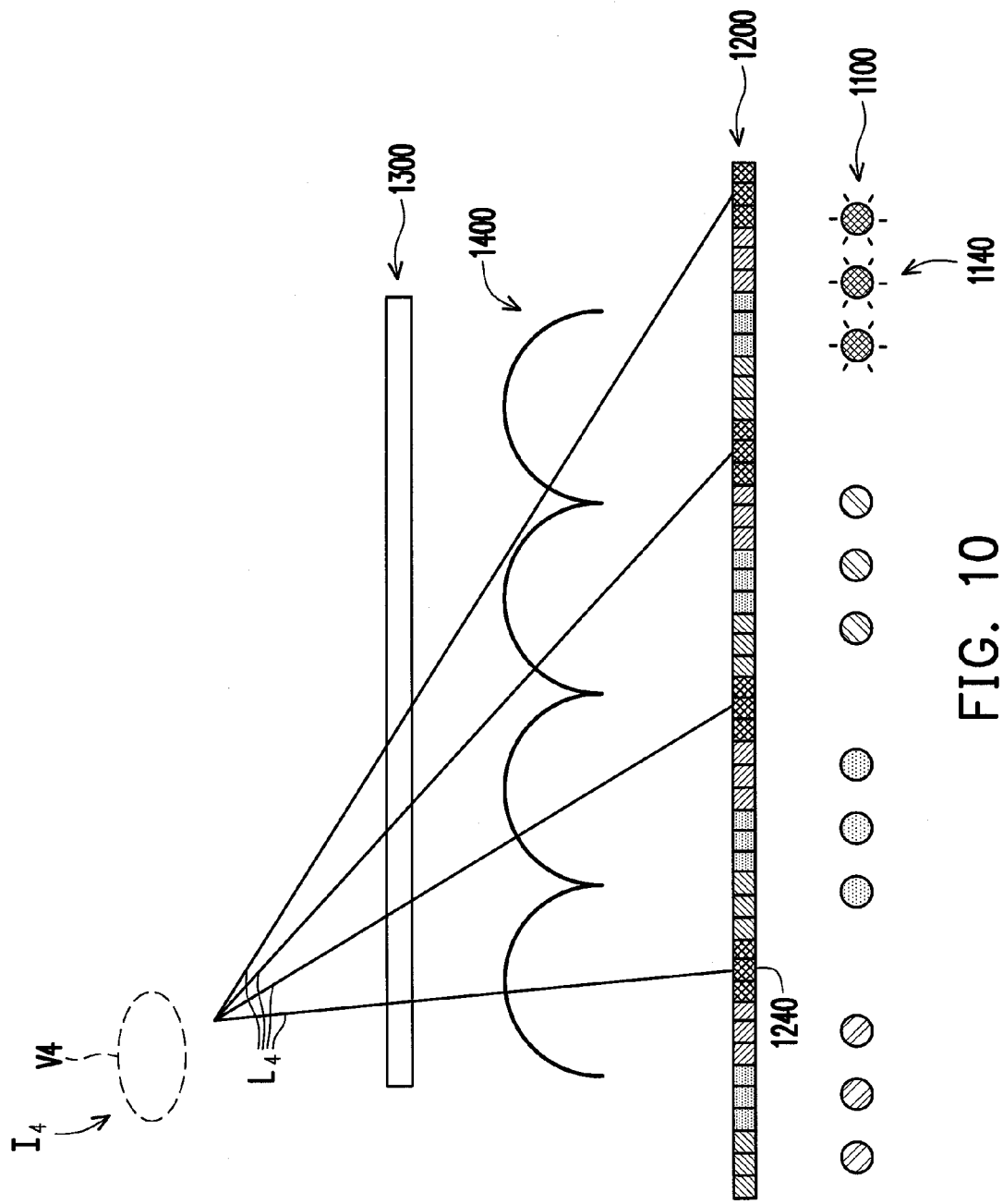

Then, FIG. 10 corresponds to the sub-frame time S4. In the sub-frame time S4, the backlight module 1100 turns on one set of light emitting devices 1140. When the set of light emitting devices 1140 is turned on, due to the function of the filtering module 1200, the light L4 passes through a plurality of sets of filtering units 1240 in the filtering module 1200, passes through pixels on the entire display panel 1300, and then reaches the viewing zone V4. Further, the pixels on the display panel 1300 display a complete image I4 of a viewing angle in the viewing zone V4.

By combining the four sub-frame time S1-S4, four complete images I1, I2, I3, I4 of different viewing angles in one frame time F1 respectively appear in four viewing zones V1, V2, V3, V4. The effect and variation of frames that can be presented by the display apparatus 1000*a* of this embodiment can be seen in the description of the embodiment in FIG. 1A and will not be described herein again.

In view of the above, in the display apparatus in the exemplary embodiments of the disclosure, a plurality of sets of filtering units having different primary transmission wavelength ranges and a plurality of sets of light emitting devices having different primary wavelength ranges are used in combination, and the plurality of sets of light emitting devices having different primary wavelength ranges is turned on by turns, so that a stereoscopic image presented by the display apparatus has a plurality of viewing angles and has the resolution and brightness as if a planar image is displayed. In addition, the pitch of light emitted by the plurality of light emitting devices can be reduced by using the plurality of sets of filtering units having different primary transmission wavelengths, so that the quality of the image is improved, thereby reducing the chance of producing stripes in the image.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A display apparatus, comprising:
   a backlight module, comprising a plurality of sets of light emitting devices, wherein each set of light emitting devices comprises at least one first color light emitting device and at least one second color light emitting device, primary wavelength ranges of light emitted by the first color light emitting devices in different sets of light emitting devices are different from each other, and primary wavelength ranges of light emitted by the second color light emitting devices in different sets of light emitting devices are different from each other;
   a filtering module, disposed on a transmission path of light emitted by the plurality of sets of light emitting devices and comprising a plurality of sets of filtering units, wherein each set of filtering units comprises a plurality of filtering units, and each set of filtering units is configured to allow light emitted by one set of light emitting devices in the plurality of sets of light emitting devices to pass through and block light emitted by another set of light emitting devices; and
   a display panel, disposed on the transmission path of the light emitted by the plurality of sets of light emitting devices, wherein the backlight module turns on the plurality of sets of light emitting devices by turns, and the display panel displays an image corresponding to the set of light emitting devices being turned on in each sub-frame time of each frame time.

2. The display apparatus according to claim 1, wherein the filtering units comprised in each set of filtering units comprise a plurality of first color filtering units and a plurality of second color filtering units, and primary transmission wavelength ranges of the first color filtering units and the second color filtering units in different sets of filtering units are different from each other.

3. The display apparatus according to claim 1, wherein each filtering unit in each set of filtering units has a plurality of primary transmission wavelength ranges, and the primary transmission wavelength ranges of each set of filtering units respectively cover the primary wavelength range of light emitted by the first color light emitting device and the primary wavelength range of light emitted by the second color light emitting device in one set of light emitting devices.

4. The display apparatus according to claim 1, further comprising a light directing device disposed between the filtering module and the display panel to direct light from different sets of filtering units respectively towards different directions.

5. The display apparatus according to claim 4, wherein the display panel displays images of different viewing angles respectively in different sub-frame times of each frame time.

6. The display apparatus according to claim 4, wherein the display panel displays a same image in different sub-frame times of each frame time.

7. The display apparatus according to claim 4, wherein a first region of the display panel displays images of different viewing angles respectively in different sub-frame times of each frame time, and a second region of the display panel displays a same image in different sub-frame times of each frame time.

8. The display apparatus according to claim 4, wherein the light directing device comprises a plurality of optical structures in periodic arrangement, each optical structure extends in a first direction, and the optical structures are arranged in a second direction.

9. The display apparatus according to claim 8, wherein the first direction is substantially parallel to an arrangement direction of a plurality of pixels in each pixel row of the display panel.

10. The display apparatus according to claim 8, wherein the first direction is inclined with respect to an arrangement direction of a plurality of pixels in each pixel row of the display panel.

11. The display apparatus according to claim 8, wherein each of the optical structures is a lenticular lens.

12. The display apparatus according to claim 8, wherein the light directing device is a parallax barrier, and each of the optical structures is a slit.

13. The display apparatus according to claim 1, wherein the display panel comprises a plurality of sets of pixels, each set of pixels respectively displays parts of images of different viewing angles in different sub-frame times of each frame time, different sets of pixels respectively display parts of images of different viewing angles in the same sub-frame time of each frame time, and the parts of the image of each viewing angle displayed by the plurality of sets of pixels in one frame time form a complete image of a viewing angle.

14. The display apparatus according to claim 1, wherein each filtering unit extends in a first direction and the filtering units are arranged in a second direction.

15. The display apparatus according to claim 14, wherein the first direction is substantially parallel to an arrangement direction of a plurality of pixels in each pixel row of the display panel.

16. The display apparatus according to claim 14, wherein the first direction is inclined with respect to an arrangement direction of a plurality of pixels in each pixel row of the display panel.

17. The display apparatus according to claim 1, wherein each filtering unit comprises a plurality of filtering sub-units, the filtering sub-units of each filtering unit are arranged in a first direction, the filtering units are arranged in a second direction, and the first direction is inclined with respect to an arrangement direction of a plurality of pixels in each pixel row of the display panel.

18. The display apparatus according to claim 1, wherein each set of light emitting devices further comprises at least one third color light emitting device, and primary wavelength ranges of light emitted by the third color light emitting devices in different sets of light emitting devices are different from each other.

19. The display apparatus according to claim 18, wherein the filtering units comprised in each set of filtering units further comprise a plurality of third color filtering units, and primary transmission wavelength ranges of the first color filtering units, the second color filtering units and the third color filtering units in different sets of filtering units are different from each other.

20. The display apparatus according to claim 18, wherein each filtering unit in each set of filtering units has a plurality of primary transmission wavelength ranges, and the primary transmission wavelength ranges of each set of filtering units respectively cover a primary wavelength range of light emitted by the first color light emitting device, a primary wavelength range of light emitted by the second color light emitting device and a primary wavelength range of light emitted by the third color light emitting device in one set of light emitting devices.

* * * * *